United States Patent [19]

Sekimori et al.

[11] 4,331,323
[45] May 25, 1982

[54] ELECTRIC WINCH SYSTEM

[75] Inventors: Toshiyuki Sekimori; Hiromichi Shigenobu, both of Toyota, Japan

[73] Assignee: Toyota Jidosha Kogyo Kabushiki Kaisha, Toyota, Japan

[21] Appl. No.: 154,500

[22] Filed: May 29, 1980

[30] Foreign Application Priority Data

Mar. 11, 1980 [JP] Japan .............................. 55-30630[U]

[51] Int. Cl.³ .......................... B66D 1/00; B61F 19/04
[52] U.S. Cl. ................................... 254/323; 254/362; 254/395; 293/117; 242/86.5 R
[58] Field of Search ............... 254/323, 325, 326, 327, 254/362, 279, 292; 293/69 R; 242/86.5

[56] References Cited

U.S. PATENT DOCUMENTS 2,700,481  1/1955  Donatelli ........................ 254/362 X
3,048,371  8/1962  Klimek, Jr. .......................... 254/362
4,127,295 11/1978  Robinson ............................ 254/362

Primary Examiner—Billy S. Taylor
Attorney, Agent, or Firm—Stevens, Davis, Miller & Mosher

[57] ABSTRACT

In an electric winch system, wherein the system includes an electric winch provided on the outside of a vehicle body, a DC power source provided within an engine room, a pair of connector parts consisting of one connector part connected to the DC power source and exposed to the outside of the vehicle body, and other connector part connectable to one connector part, and a control switch connected to the other connector part, thereby controlling the running of an electric motor of the electric winch by way of the pair of connector parts, when the pair of connector parts are joined together, this electric winch system comprises; a power source switch provided between the DC power source and the electric winch in the vehicle body; and a power-source-switch controlling means adapted to turn the power source switch to a close position only when the pair of connector parts are joined together. By this arrangement, in the event that the electric winch is broken due to the collision of automotive vehicles during the running thereof, there is no risk that the DC power source is short-circuited, and hence a fire of the automotive vehicle is avoided. Furthermore, electric errosion is avoided.

6 Claims, 3 Drawing Figures

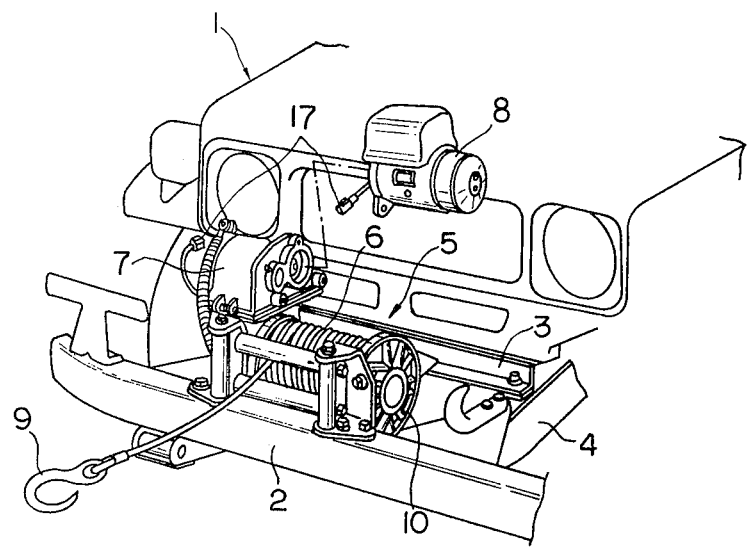
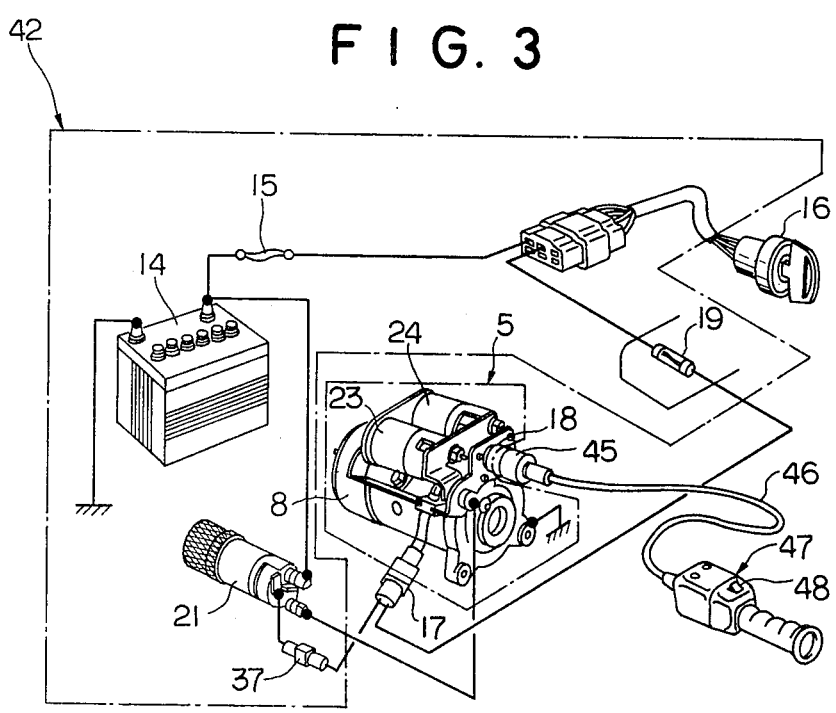

ELECTRIC WINCH SYSTEM

BACKGROUND OF THE INVENTION

1. Field of the Invention

This invention relates to an electric winch system mounted on a vehicle body of a special automotive vehicle, with a view to drawing heavy objects.

2. Description of the Prior Art

An electric winch of such an electric winch system is mounted on the outside of an automotive vehicle, such as on a front portion, as an assembly unit including an electric motor and relays for controlling rotation in the normal direction or in the reverse direction, of an electric motor, and the assembly unit is usually fed with a voltage. This, however, is responsible for formation of a short-circuit in the automotive vehicle, which would lead to occurance of an automotive fire from a motorcar accident, such as results from the collision of automotive vehicles.

SUMMARY OF THE INVENTION

It is accordingly an object of the present invention to provide an electric winch system which prevents with certainty an automotive fire upon collision of automotive vehicles, as well as prevents electrical damage.

To attain the object, there is provided according to the present invention an electric winch system including an electric winch provided on the outside of an automotive vehicle, a DC power source provided in an engine room, a pair of connector parts consisting of one connector part connected to the DC power source and exposed to the outside of the automotive vehicle, and another connector part adapted to be connected to one connector part, and a control switch connected to the other connector part and adapted to control the running of an electric motor of the electric winch by way of the pair of connector parts when the pair of connector parts are joined together. The aforesaid electric winch system is characterized by a power source switch provided between the DC power source and the electric motor of the electric winch in the automotive vehicle, and a power-source-switch controlling means adapted to turn the power source switch to a closed position only when the pair of connector parts are joined to each other.

By the above-described arrangement of the present invention, normally a voltage can not reach the outside of an automotive vehicle, but is applied to the electric winch provided on the outside of the vehicle body only when the pair of connector parts are connected to each other for operating the electric winch. In the event that the electric winch is damaged due to the collision of automotive vehicles during the running of the automotive vehicle, there is no risk that the DC power source is short-circuited, which would lead to an automobile fire, and electric damage is prevented.

Preferably, the power source switch is constituted from contact portions of relays, and the power-source-switch controlling means is a closed circuit which is completed by way of the coils of the relays when the pair of connector parts are connected to each other. As soon as the pair of connector parts are connected to each other for operating the electric winch, a relay serving as the power source switch closes, thereby allowing a current to flow from the DC power source to the electric winch.

Preferably, the electric motor of the electric winch is a DC series motor, and the control switch is adapted to control a direction of a field system of the DC series motor, thereby running the DC series motor in the normal direction or in the reverse direction.

Preferably, the electric winch is an assembly unit, which comprises a winch mechanism, an electric motor for operating the winch mechanism, a normal rotation relay and a reverse rotation relay both of which are provided between the power source switch and the electric motor and controlled by the control switch. Preferably, the normal rotation relay and the reverse rotation relay are connected to separate series field coils of the electric motor, respectively, and these series field coils are so arranged as to form fields systems directed opposite to each other.

Preferably, the assembly unit of the electric winch comprises a temperature detecting means for detecting the temperature of the electric motor, and the control switch assembly unit comprises indication means adapted to be connected by way of the pair of connector parts to the temperature detecting means, and a control switch.

BRIEF DESCRIPTION OF THE DRAWINGS

FIG. 1 is a perspective view, partly exploded, of an electric winch provided in the front portion of an automotive vehicle;

DETAILED DESCRIPTION OF THE INVENTION

Figure 2:
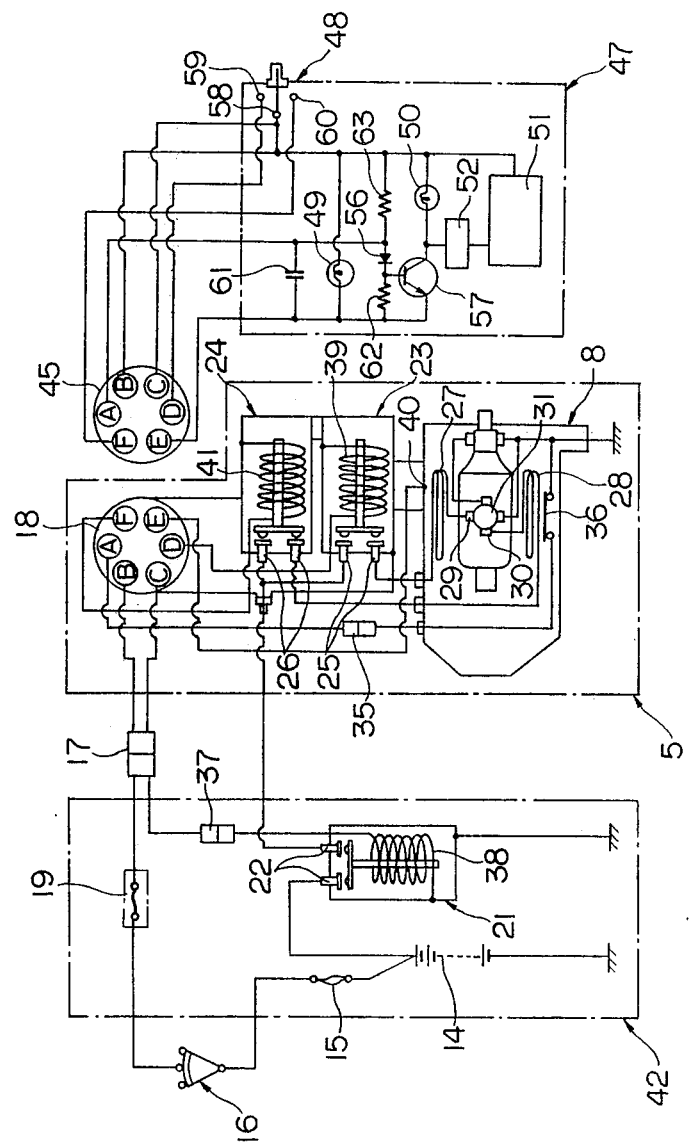
FIG. 2 is a wiring diagram showing a preferred embodiment of the present invention; and, FIG. 3 shows an arrangement of the electric winch system of the present invention.

In the front portion of the outside of a vehicle body 1, a bumper 2 and a base member 3 spaced apart a given distance from the bumper 2 are attached to the front end of a side frame 4. An electric winch 5 is mounted on the bumper 2 and the base member 3 and fixed thereto. The electric winch 5 is formed as an assembly unit, which is shown partly exploded in FIG. 1, and which comprises a lower winch mechanism 10 including a drum to which is wound a cable of a given length 6, and an upper DC series electric motor 8 connected by way of a gear unit 7 to the winch mechanism 10. A hook 9 is attached to the one end of the cable 6.

FIGS. 2 and 3 show connection and arrangement diagram of the electric winch system, respectively.

A battery 14 serving as a DC power source is earthed at one end and connected at the other end to a terminal B of one connector part 18 by way of a fuse link 15, an ignition switch 16 in the driver's room, a fuse 19 and a connector 17. The other end of the battery 14 is further connected by way of contact pair 22 of a relay 21 to one of terminal pairs 25 and 26 of normal rotation relay 23 and reverse rotation relay 24. The other of terminal pairs 25 and 26 of normal and reverse rotation relays 23 and 24 are connected to field coils 27 and 28 of the electric motor 8, respectively, and further connected by way of brushes 29 and 30 of respective coils to a common armature coil 31. A terminal A of the connector part 18 is connected by way of a connector 35 to a bimetal switch 36 of the electric motor 8. The bimetal switch 36 is normally maintained closed and adapted to open when the motor 8 is overheated. In the connector part 18, a terminal C is connected by way of the connector 17 and a connector 37 to a coil 38 of a relay 21 serving as a power source switch; a terminal D is connected to a coil 39 of the normal rotation relay 23; a terminal E is connected to an earth terminal 40 of the motor 8; and a terminal F is connected to a coil 41 of the reverse rotation relay 24. The battery 14, the fuse link 15, the connector 37, the fuse 19 and the relay 21 are disposed within an engine room 42. The contact pair 22 are positioned as close as possible to the battery 14.

The other connector part 45 adapted to be joined to the one connector part 18 is connected by means of a cord 46 (FIG. 3) to a control switch assembly unit 47. The assembly unit 47 comprises a control switch 48, a power source indication lamp 49, a motor-overheat-warning lamp 50, a motor-overheat warning buzzer 51 and an oscillator 52 for the warning buzzer 51.

In the other connector part 45, a terminal A is connected by way of a diode 56 to the base of a switching transistor 57; a terminal B is connected to a base terminal 58 of the control switch 48, the indication lamp 49, the warning lamp 50 and the warning buzzer 51; a terminal C is connected by way of the assembly unit 47 to the terminal B; a terminal D is connected to a normal rotation terminal 59 of the control switch 48; a terminal E is connected to the indication lamp 49, and the emitter of the switching transistor 57; and a terminal F is connected to a reverse rotation terminal 60 of the control switch. The other connector part 45 is adapted to be plugged in one connector part 18 in a manner that terminals A through F of the former are connected to the corresponding terminals of the latter. A capacitor 61 for stabilizing a base voltage of the switching transistor 57 is connected between the terminals A and E, and bias resistors 62 and 63 are connected to the base of the switching transistor 57. When the connector parts 18 and 45 are joined to each other, the power source indication lamp 49 is lit, and a current is allowed to flow from the base of the switching transistor 57 to the bimetal switch 36. Consequently, if the motor remains at a temperature lower than a predetermined temperature, the bimetal switch 36 remains close, and the base potential of the switching transistor 57 is maintained at a zero level, whereas the transistor 57 remains non-conducting, and hence a current is supplied neither to the warning lamp 50 nor to the warning buzzer 51. When the electric motor 8 is overheated, the bimetal switch 36 is turned to an open position, and the base voltage of the switching transistor 57 is raised to a level higher than the emitter voltage thereof, whereas the switching transistor 57 becomes conducting, whereby the warning lamp 50 is lit and the warning buzzer 51 buzzes.

In operation, while the electric winch 5 remains inoperative, the connector parts 18 and 45 are maintained disconnected, so that a current does not flow to the coil 38 of the relay 21, and the contact pair 22 remain disconnected. A voltage from the battery 14 can not reach the electric winch 5. In the event that the electric winch 5 is broken due to the automotive collision, the battery 14 is by no means short-circuited.

When it is desired to operate the electric winch 5, the connector part 45 is plugged into the connector part 18. Since the terminal B and C in the connector part 45 are connected to each other, a current is allowed to flow from the battery 14 by way of the terminal C of the connector part 18 to the coil 38 of the relay, thereby rendering the contact pair 22 connected. In an operator connects the base terminal 58 in the control switch 48 to the normal rotation terminal 59 or the reverse rotation terminal 60, then a current is caused to flow to the coil 39 or 41 of the normal rotation relay 23 or the reverse rotation relay 24, thereby rendering the terminal pair 25 or 26 connected, whereby the electric motor 8 is rotated in the normal direction or in the reverse direction, thereby moving the cable 6 in an unwinding direction or in a winding direction.

According to the present invention, only when the connector parts 18 and 45 are joined to each other for operating the electric winch 5, a voltage is applied to the electric winch mounted on the outside of the vehicle body, but usually not supplied thereto. Thus, electric damage is prevented, and in the event that the electric winch 5 is broken due to an automotive collision, there is no risk that the battery 14 is short-circuited.

What is claimed is:

1. An electric winch system comprising:
   an electric winch provided on the outside of a vehicle body;
   a DC power source within an engine compartment of said vehicle;
   a direction control switch assembly including a control switch;
   a pair of connector parts, said connector parts when communicating together providing a first circuit for actuating a means controlling a power switch connector to said winch whereby said winch is energized only when said connector parts communicate, and a second circuit responsive to said direction control switch for controlling the direction of said winch;
   a power switch, said power switch applying an operating voltage to said winch; and
   means for controlling said power switch in response to a signal from said first circuit whereby said power switch is enabled when said connector parts are communicating.

2. An electric winch system as defined in claim 1, wherein said means for controlling said power switch comprises a relay, and said means for controlling provides a closed circuit which is completed through energization of a coil of said relay when said pair of connector parts are joined to each other.

3. An electric winch system as defined in claim 2, wherein said winch include an DC series electric motor, and said control switch controls a direction of the field of said DC series motor.

4. An electric winch system as defined in claim 3, wherein said electric winch is an assembly which comprises a winch mechanism, the electric motor for operating said winch mechanism, a normal rotation relay, and a reverse rotation relay, both of which are provided between said power switch means and said electric motor and controlled by said means for controlling.

5. An electric winch system as defined in claim 4, wherein said normal rotation relay and said reverse rotation relay are connected to separate series field coils of said electric motor, respectively, and said series field coils are so arranged as to form field systems directed opposite to each other when a current is supplied thereto.

6. An electric winch system as defined in claim 5, wherein said electric winch assembly comprises a means for detecting a temperature of said electric motor, and said control switch assembly comprises said control switch and indication means connected by way of said pair of connector parts to said temperature detecting means.

* * * * *